United States Patent [19]

Takei

[11] Patent Number: 5,357,158
[45] Date of Patent: Oct. 18, 1994

[54] DIRECT CURRENT LINEAR MOTOR AND A DIRECT DRIVE UNIT ON WHICH IT IS EQUIPPED

[75] Inventor: Seiji Takei, Kanagawa, Japan

[73] Assignee: Nippon Thompson Co., Ltd., Tokyo, Japan

[21] Appl. No.: 7,781

[22] Filed: Jan. 22, 1993

[30] Foreign Application Priority Data

Feb. 13, 1992 [JP] Japan .................. 4-058859

[51] Int. Cl.⁵ .................................... H02K 41/00
[52] U.S. Cl. ............................... 310/12; 310/68 B
[58] Field of Search ............. 310/12, 14, 68 R, 68 B, 310/68 C

[56] References Cited

U.S. PATENT DOCUMENTS 5,225,725  7/1993  Shiraki et al. ..................... 310/12

FOREIGN PATENT DOCUMENTS 63-34468  9/1988  Japan .

*Primary Examiner*—Steven L. Stephan
*Assistant Examiner*—Judson H. Jones
*Attorney, Agent, or Firm*—Sughrue, Mion, Zinn, Macpeak & Seas

[57] ABSTRACT

A direct current linear motor and direct drive unit that has a thin shape, is inexpensive and effectively dissipates heat from heat-generating electronic components.

The above-mentioned advantages are obtained as a result of using a coil yoke as a circuit board by attaching electronic components and so on to said coil yoke equipped on a primary side.

4 Claims, 5 Drawing Sheets

DIRECT CURRENT LINEAR MOTOR AND A DIRECT DRIVE UNIT ON WHICH IT IS EQUIPPED

BACKGROUND OF THE INVENTION

1. Field of the Invention

The present invention relates to a direct current linear motor variously used for precisely moving an object to be moved in a linear motion mechanism such as a machine tool or industrial robot, and a direct drive unit in which a guiding device for guiding said object is added to said direct current linear motor.

2. Description of the Prior Art

An example of this type of direct current linear motor and direct drive unit of the prior art is the movable magnet type indicated in FIG. 1. Furthermore, an example of this prior art is disclosed in Japanese Examined Utility Model Publication 63-34468.

As indicated in FIG. 1, said direct current linear motor has a primary side comprising coil yoke 2 provided so as to extend along roughly the entire length (with the lengthwise direction being the direction perpendicular to the paper surface) of long guide rail 1 on said guide rail, and armature coil group 3 wound in a prescribed form on said coil yoke 2. In contrast, the secondary side has field magnet 5 mounted so that a plurality of N and S magnetic poles are alternately arranged along the lengthwise direction of guide rail 1 in the direction of movement, and magnet yoke 6 provided behind said field magnet 5. These primary and secondary sides are arranged so that the respective armature coil group 3 and field magnet 5 are mutually opposing each other while allowing relative movement. More specifically, a pair of rollers 7a and 7b are provided on both sides of magnet yoke 6 mounted on field magnet 5. Each of said rollers is able to roll on guide rail 1. A guiding device that mutually guides the above-mentioned primary and secondary sides is composed by these rollers 7a, 7b and guide rail 1.

Printed board 8 is attached on the bottom surface of coil yoke 2. Electronic component group 9, including IC and transistors that compose a control circuit, is attached on the bottom surface of this printed board 8. In addition, electromagnetic conversion device 10, comprising a Hall device for detecting the relative positions of the above-mentioned primary and secondary sides, is mounted on the upper side of printed board 8. A plurality of these electromagnetic conversion devices 10 are mounted in a row at prescribed pitch in the direction of relative movement of the above-mentioned primary and secondary sides, and oppose field magnet 5 through opening 2a formed in coil yoke 2.

In the direct drive unit containing the direct current linear motor having the above-mentioned constitution, thrust is produced in accordance with Fleming's left hand rule between the primary and secondary sides as a result of supplying a prescribed electrical current to armature coil group 3. If, for example, the primary side is taken to be the stationary side, the secondary side moves due to this thrust.

The above-mentioned direct current linear motor and direct drive unit of the prior art has the disadvantage of printed board 8, equipped with electromagnetic conversion device 10 and a control circuit including electronic component group 9, and coil yoke 2, that is a constituent member of the primary side, taking up a comparatively large amount of space. As such, this disadvantage must be overcome in order to reduce the overall size and thickness of said motor and unit. In addition, the large number of parts contributes to increased costs.

Moreover, since printed board 8 is heat insulated, heat produced by the IC and transistors, etc., provided on said printed board tends to accumulate easily, thus resulting in the risk of this heat having a detrimental effect on the control circuit.

SUMMARY OF THE INVENTION

In consideration of the above-mentioned shortcomings of the prior art, the object of the present invention is to provide a direct current linear motor and direct drive unit that has a thin design, is inexpensive, and is able to effectively dissipate heat from heat-generating electronic components.

The present invention is composed of a direct current linear motor comprising: a primary side containing an armature coil group and a coil yoke arranged in the vicinity of said armature coil group; and, a secondary side having a field magnet alternately mounted along the direction in which N and S magnetic poles are to move; wherein, said primary side and secondary side are arranged such that the above-mentioned armature coil group and above-mentioned field magnet are mutually opposing each other so that the above-mentioned primary side and above-mentioned secondary side perform relative movement by supplying an electrical current to the above-mentioned armature coil group; and wherein, the above-mentioned coil yoke acts as a circuit board by loading electronic components on the above-mentioned coil yoke.

In addition, the present invention is composed of a direct current linear motor comprising: a primary side containing an armature coil group and a coil yoke arranged in the vicinity of said armature coil group; and, a secondary side having a field magnet alternately mounted along the direction in which N and S magnetic poles are to move; wherein, said primary side and secondary side are arranged such that the above-mentioned armature coil group and above-mentioned field magnet are mutually opposing each other so that the above-mentioned primary side and above-mentioned secondary side perform relative movement by supplying an electrical current to the above-mentioned armature coil group; and, a direct drive unit containing a guiding device that mutually guides the above-mentioned primary side and above-mentioned secondary side; wherein said direct current linear motor and direct drive unit, the above-mentioned coil yoke acts as a circuit board by loading electronic components on the above-mentioned coil yoke.

DESCRIPTION OF THE PREFERRED EMBODIMENTS

The following provides a description of the preferred embodiments of the direct current linear motor and direct drive unit containing said motor pertaining to the present invention with reference to the drawings. Furthermore, this direct current linear motor is of the movable magnet type.

The direct current 11near motor pertaining to the present invention is composed of a primary side and a secondary side. In the present embodiment, the primary side is referred to as the power supply side or the stationary side, while the secondary side is referred to as the movable side.

Firstly, an explanation of the guiding device that mutually guides these primary and secondary sides is provided.

Figure 1:
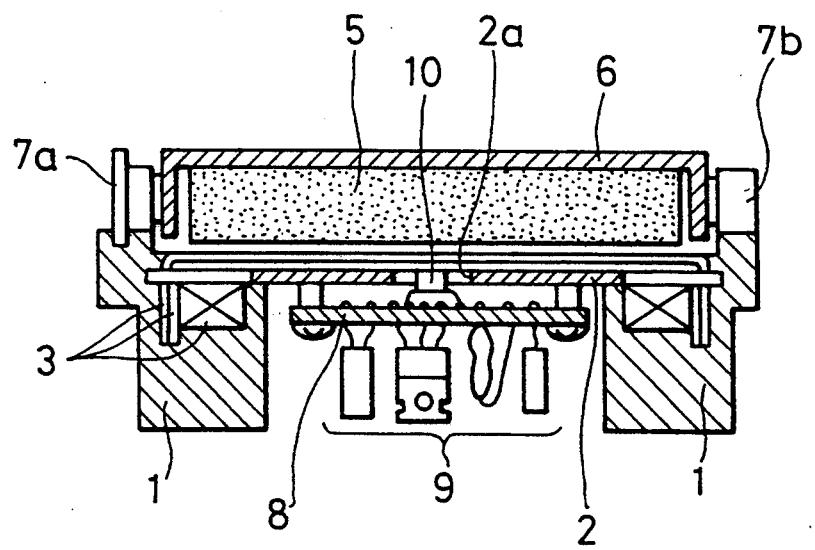
FIG. 1 is a vertical cross-sectional view of a drive unit containing the direct current linear motor of the prior art.
Figure 2:
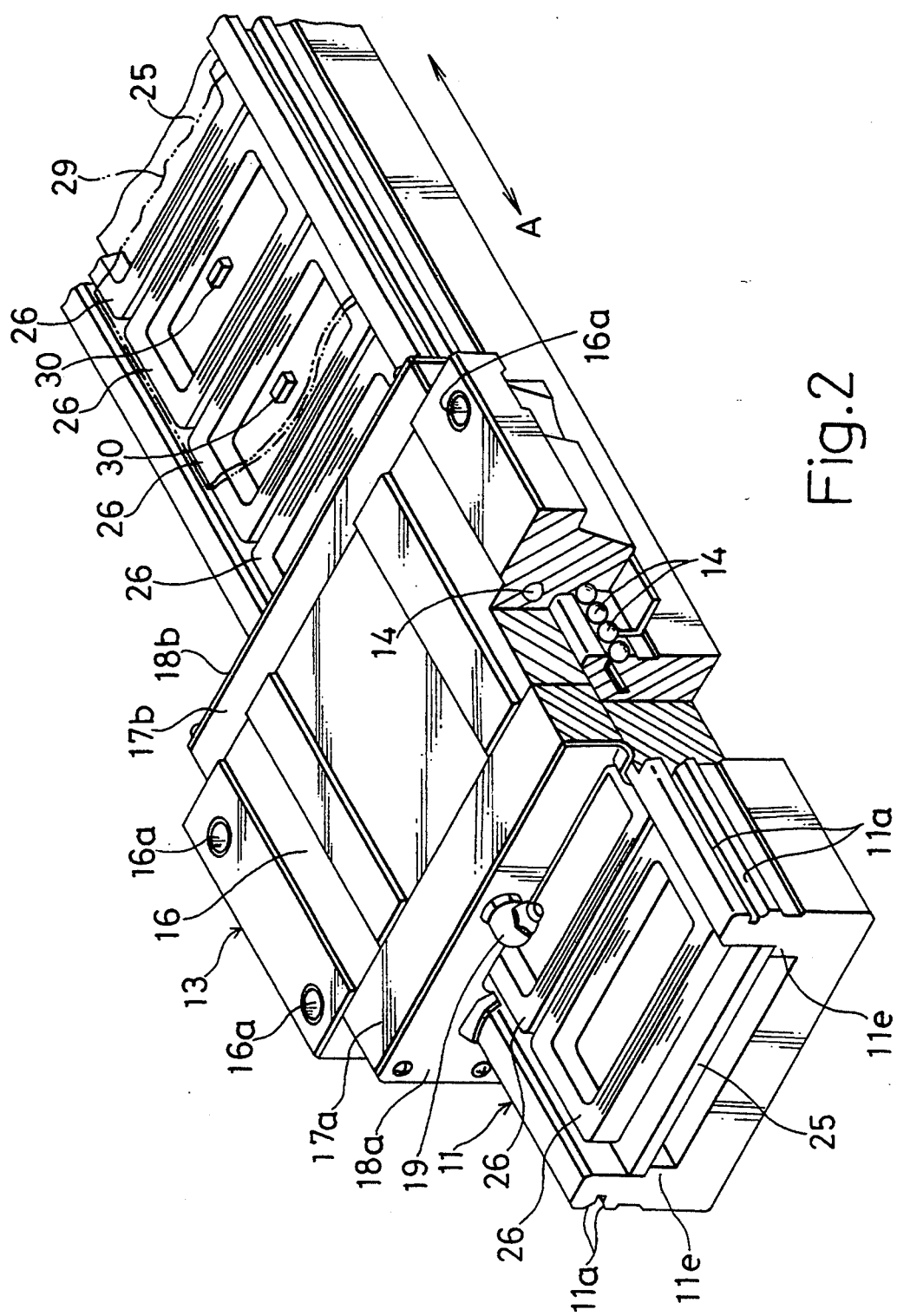
FIG. 2 is a perspective view, including a partial cross-sectional view, of the essential elements of a direct drive unit containing the direct current linear motor of a first embodiment of the present invention.
Figure 3:
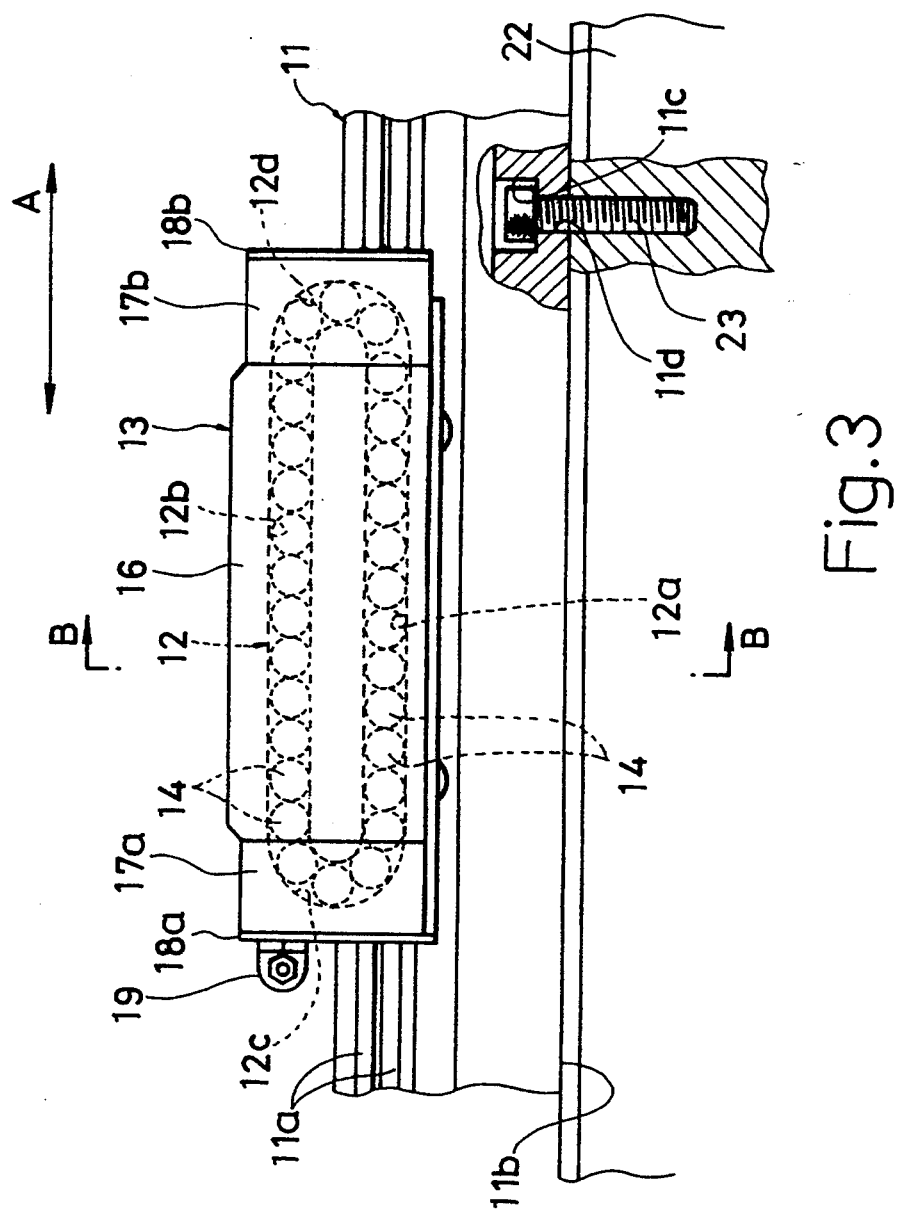
FIG. 3 is a side view, including a partial cross-sectional view, indicating the direct drive unit indicated in FIG. 2 attached to the bed of a machine tool.
Figure 4:
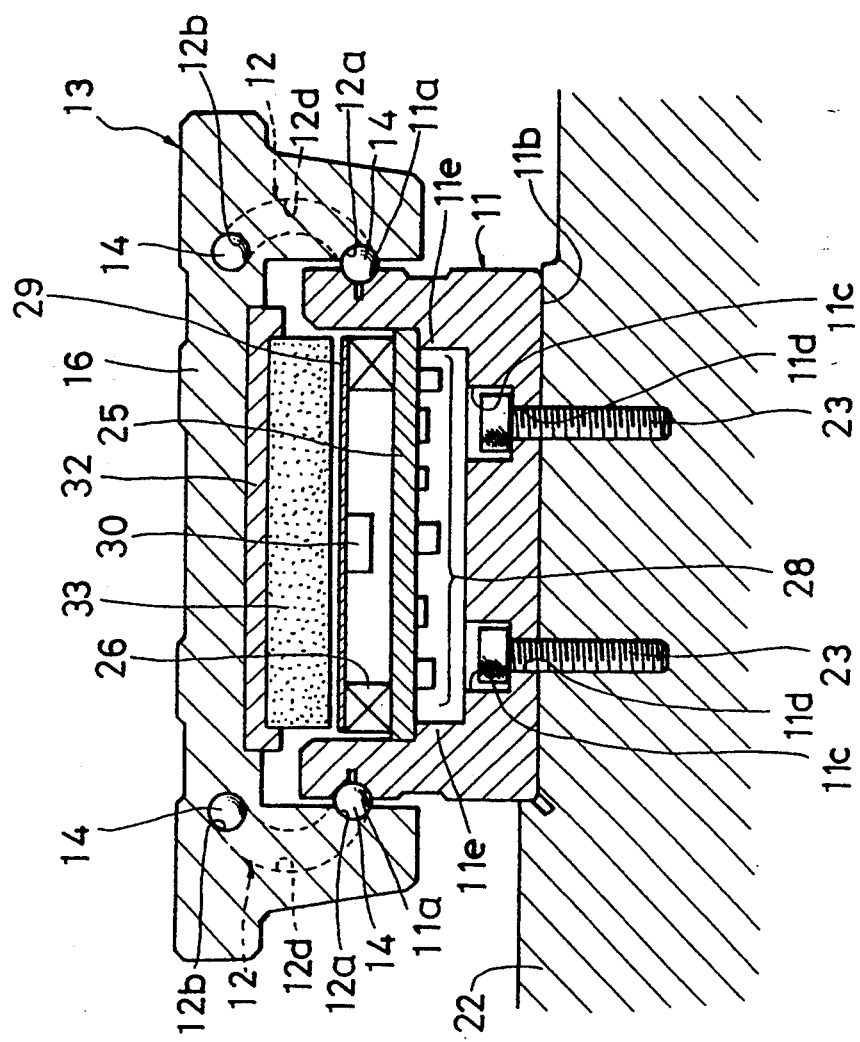
FIG. 4 is a cross-sectional view taken along line B—B relating to FIG. 3.

As indicated in FIG. 2 through FIG. 4, this guiding device has rail 11, formed so that the shape of its perpendicular cross-section with respect to its lengthwise direction is opened upwards roughly in the shape of the letter "U", rolling element circulating path 12 (reference numerals indicated in FIGS. 2 and 3, details to be described later), and sliding unit 13 serving as a slider able to move relative to said rail 11. One each of rail grooves 11a are formed along the axial direction on the left and right outer sides of rail 11 having a semi-circular cross-section. However, the number of these rail grooves 11a is not always limited to two. Two of the above-mentioned rolling element circulating paths 12 are provided to correspond to each of these rail grooves 11a. Within said rolling element circulating path 12, a plurality of balls 14 are arranged and contained serving as rolling elements that circulate while rolling along rail grooves 11a accompanying movement of sliding unit 13, and bear the load between rail 11 and sliding unit 13.

This sliding unit 13 has casing 16 straddled across rail 11, a pair of end caps 17a and 17b coupled to both ends of said casing 16, and two seals 18a and 18b attached to the outer surfaces of said end caps 17a and 17b. Furthermore, grease nipple 19 is attached to end cap 17a for supplying grease to the above-mentioned balls 14. As indicated in FIG. 3 and FIG. 4, each rolling element circulating path 12 is composed of load-bearing rail groove 12a and return path 12b formed linearly and mutually in parallel on both the left and right sides of casing 16, and a pair of semi-circular shaped directional changing paths 12c and 12d formed in both end caps 17a and 17b that connect said load-bearing rail groove 12a and return path 12b with both of these ends. Furthermore, the above-mentioned load-bearing rail groove 12a opposes rail groove 11a of rail 11.

The guiding device having the above-mentioned constitution is arranged, for example, on flat bed 22 on which is equipped a machine tool indicated in FIG. 3 and FIG. 4 (the entire machine tool is not shown). Rail 11 is fastened to said bed 22 by a plurality of bolts 23 (with hexagon sockets). Consequently, rail 11 has a flat mounting surface 11b for mounting on bed 22 on its bottom. Furthermore, as indicated in FIG. 3 and FIG. 4, counterbore 11c, having a diameter larger than the heads of said bolts 23, and through hole 11d, having a diameter slightly larger than the threaded portions of bolts 23, are formed concentrically in the bottom of rail 11. Bolts 23 are inserted into said counterbore 11c and through hole 11d so that they are entirely embedded when screwed into bed 22. In addition, as indicated in FIG. 2, a plurality of threaded holes 6a are formed in the upper surface of casing 16 of sliding unit 13. A table that holds the workpiece and so on (not shown) is fastened to said casing 16 by bolts (with hexagon sockets, not shown) that are screwed into these threaded holes 16a.

The following provides a description of the primary and secondary sides of the direct current linear motor that are mutually guided by the guiding device having the above-mentioned constitution.

As indicated in FIG. 2 and FIG. 4, said primary side has rectangular-shaped coil yoke 25 provided so as to extend over roughly the entire length of rail 11 on said rail, and a plurality of armature coils 26 arranged in a row on said coil yoke 25. Furthermore, coil yoke 25 is arranged near the bottom of rail 11 formed such that the shape of its cross-section opens upward in the shape of the letter "U". More specifically, two support ledges 11e are formed in rail 11 near the bottom of said rail, and coil yoke 25 is supported by these support ledges 11e. Moreover, coil yoke 25 is also fixed to each supporting ledge by means of adhesive or small screws, etc. In addition, as indicated in the drawings, each armature coil 26 is wound into a roughly rectangular shape.

As indicated in FIG. 4, electronic component group 28, consisting of IC, transistors and so on composing a control circuit, is provided on the lower surface of coil yoke 25. A wiring pattern for electrically connecting these electronic components together is etched on the surface of coil yoke 25. However, said wiring and coil yoke 25 are electrically insulated from each other. In other words, coil yoke together with the insulated wiring pattern 25 is composed to act as a circuit board.

In addition, plastic thin plate 29 is mounted on the upper surface of each armature coil 26 to fix in position each of said armature coils. Electromagnetic conversion devices 30 comprised of Hall devices and so on are attached to the bottom surface of said plate 29 to detect the relative positions of the primary side, having coil yoke 25 and armature coil 26, and the secondary side to be described later. A plurality of these electromagnetic conversion devices 30 are mounted in a row at prescribed intervals in the direction of relative movement of said primary and secondary sides so as to be positioned on the inside of each of the above-mentioned armature coils 26. In addition, these electromagnetic conversion devices 30 are connected to the control circuit containing electronic component group 28.

On the other hand, the secondary side has the constitution described below.

Figure 5:
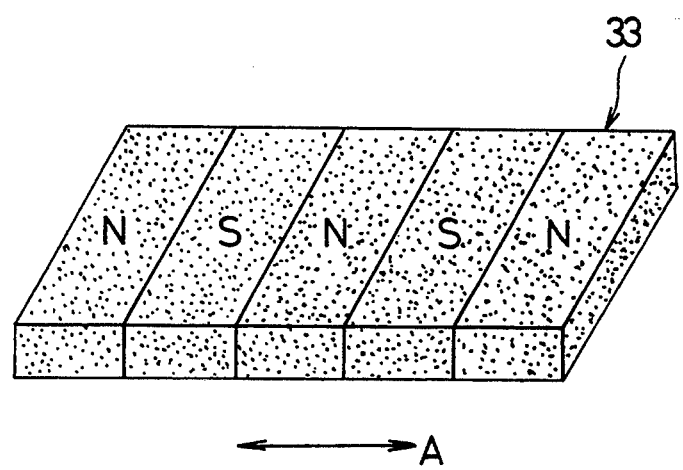
FIG. 5 is a perspective view of the field magnet equipped on the direct drive unit indicated in FIG. 2 through FIG. 4.

As indicated in FIG. 4, said secondary side has magnet yoke 32 mounted on the lower side of casing 16, a constituent member of sliding unit 13, and field magnet 33 mounted on the lower surface of said magnet yoke 32 so as to oppose each of the armature coils 26 of the above-mentioned primary side. As is clear from FIG. 5, the overall shape of field magnet 33 is roughly rectangular, and a plurality of N and S magnetic poles are mounted so that, as in this case, 5 poles are arranged alternately side by side along direction A in which relative movement is performed by the primary side and secondary side, or in other words, the lengthwise direction of rail 11.

In the direct drive unit containing the above-mentioned direct current linear motor, thrust is produced in accordance with Fleming's left hand rule between the primary and secondary sides as a result of supplying a prescribed electrical current to armature coils 26 in the constitution indicated in FIG. 4. Consequently, the secondary side moves with respect to the stationary primary side resulting in linear motion by sliding unit 13.

Furthermore, the direct drive unit containing the above-mentioned direct current linear motor may, for example, be used so that sliding unit 13 supports a table (not shown) to transport a workpiece, etc., (not shown) on said table that is placed and fixed on said table.

In addition, although balls 14 circulate within sliding unit 13 accompanying movement of said sliding unit in the above-mentioned embodiment, other constitutions may naturally also be applied without being limited to this particular constitution. Moreover, although balls are used for the rolling element in the above-mentioned embodiment, a constitution may also be employed in which rollers are used for the rolling element.

In addition, although a mechanical constitution is indicated for the guiding device that mutually guides the primary and secondary sides in the above-mentioned embodiment, it is also possible to use a guiding device wherein both the primary and secondary sides are relatively suspended by the pressure of a fluid (such as air or oil) or the magnetic force of a magnet.

Moreover, although a movable magnet type of direct current linear motor was indicated in the above-mentioned embodiment, wherein the armature coil 26 side is stationary while the field magnet 23 side is movable, the present invention can also be applied to a movable coil type of direct current linear motor.

According to the present invention as explained above, since a coil yoke is used to function as a circuit board, the present invention offers the first advantage of reduced size and thickness of the direct current linear motor and direct drive unit. In addition, due to small number of parts, the present invention offers the second advantage of reduced costs.

Moreover, since the coil yoke is able to dissipate a large amount of heat, the present invention offers the third advantage of being able to prevent heat from having a detrimental effect on the control circuit, which is susceptible to heat, by being able to effectively dissipate the heat from heat-producing electronic components loaded on said coil yoke.

What is claimed is:

1. A direct current linear motor comprising: a primary side containing an armature coil group and a coil yoke arranged in the vicinity of said armature coil group; and, a secondary side having a field magnet alternately mounted along the direction in which N and S magnetic poles are to move; wherein, said primary side and secondary side are arranged such that the above-mentioned armature coil group and above-mentioned field magnet are mutually opposing each other so that the above-mentioned primary side and above-mentioned secondary side perform relative movement by supplying an electrical current to the above-mentioned armature coil group; and wherein, the above-mentioned coil yoke, together with an insulated wiring pattern formed on said yoke, acts as a circuit board by loading electronic components onto the above-mentioned coil yoke.

2. The direct current linear motor of claim 1 wherein an electromagnetic conversion device for detecting the relative positions of the above-mentioned primary side and above-mentioned secondary side is provided on the above-mentioned coil yoke.

3. A direct drive unit containing a direct current linear motor comprising: a primary side containing an armature coil group and a coil yoke arranged in the vicinity of said armature coil group; a secondary side having a field magnet alternately mounted along the direction in which N and S magnetic poles are to move; wherein, said primary side and secondary side are arranged such that the above-mentioned armature coil group and above-mentioned field magnet are mutually opposing each other so that the above-mentioned primary side and above-mentioned secondary side perform relative movement by supplying an electrical current to the above-mentioned armature coil group; and, a guiding device that mutually guides the above-mentioned primary side and above-mentioned secondary side; wherein the above-mentioned coil yoke, together with an insulated wiring pattern formed on said yoke, acts as a circuit board by loading electronic components on the above-mentioned coil yoke.

4. The direct drive unit of claim 3 wherein the above-mentioned guiding device is composed of a rail coupled with either the above-mentioned primary side or above-mentioned secondary side, in which rail grooves are formed on both the left and right sides, and a slider coupled to the other above-mentioned primary side or above-mentioned secondary side, guided by the above-mentioned rail while allowing a plurality of rolling elements to rotate freely and holding said rolling elements in contact with the above-mentioned rail groove.

* * * * *